Dec. 10, 1963   B. T. RUTLEDGE   3,113,770
CHIROPRACTOR'S TABLE
Filed Nov. 28, 1960   8 Sheets-Sheet 1

INVENTOR.
BEN T. RUTLEDGE
BY
George B. White
ATTORNEY

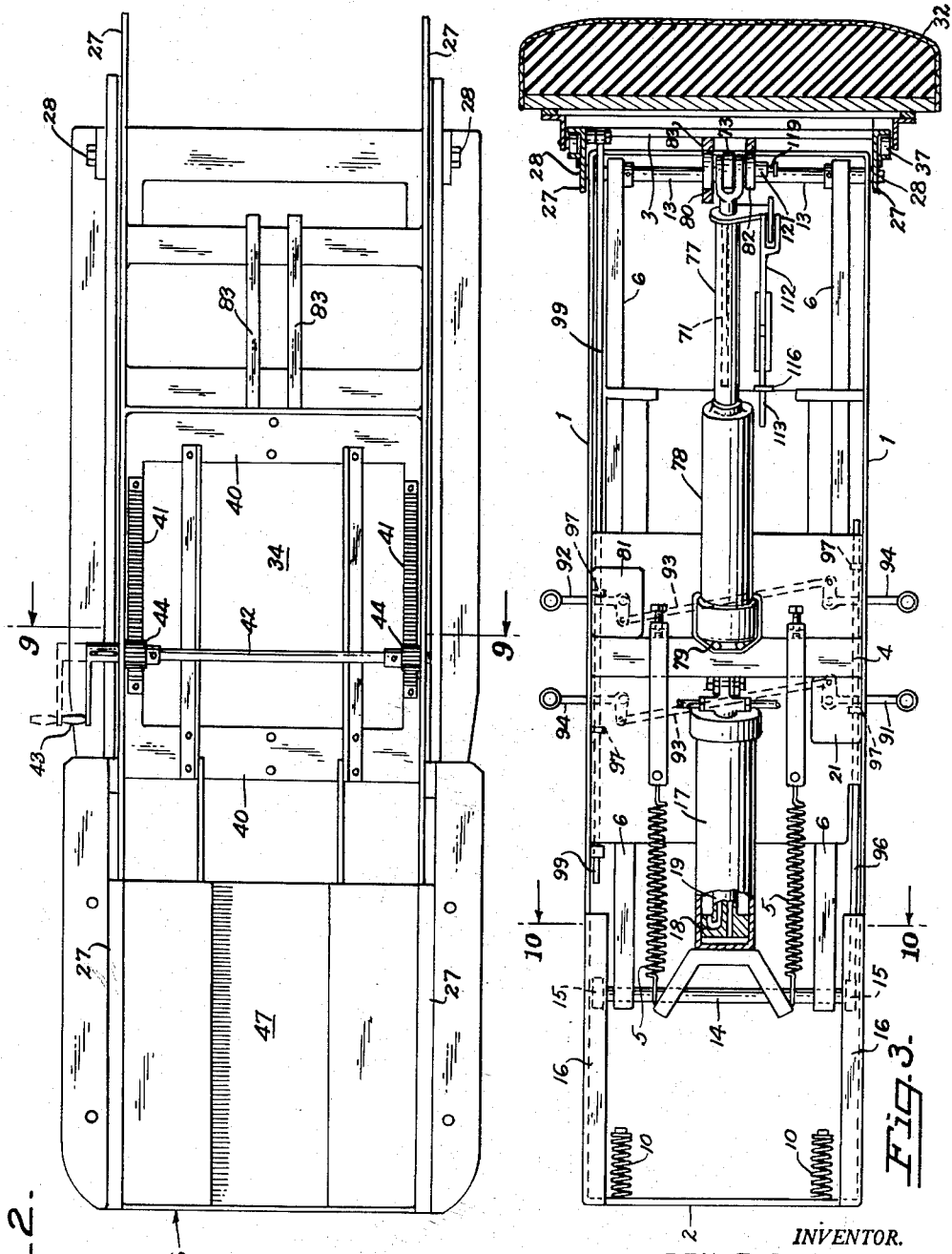

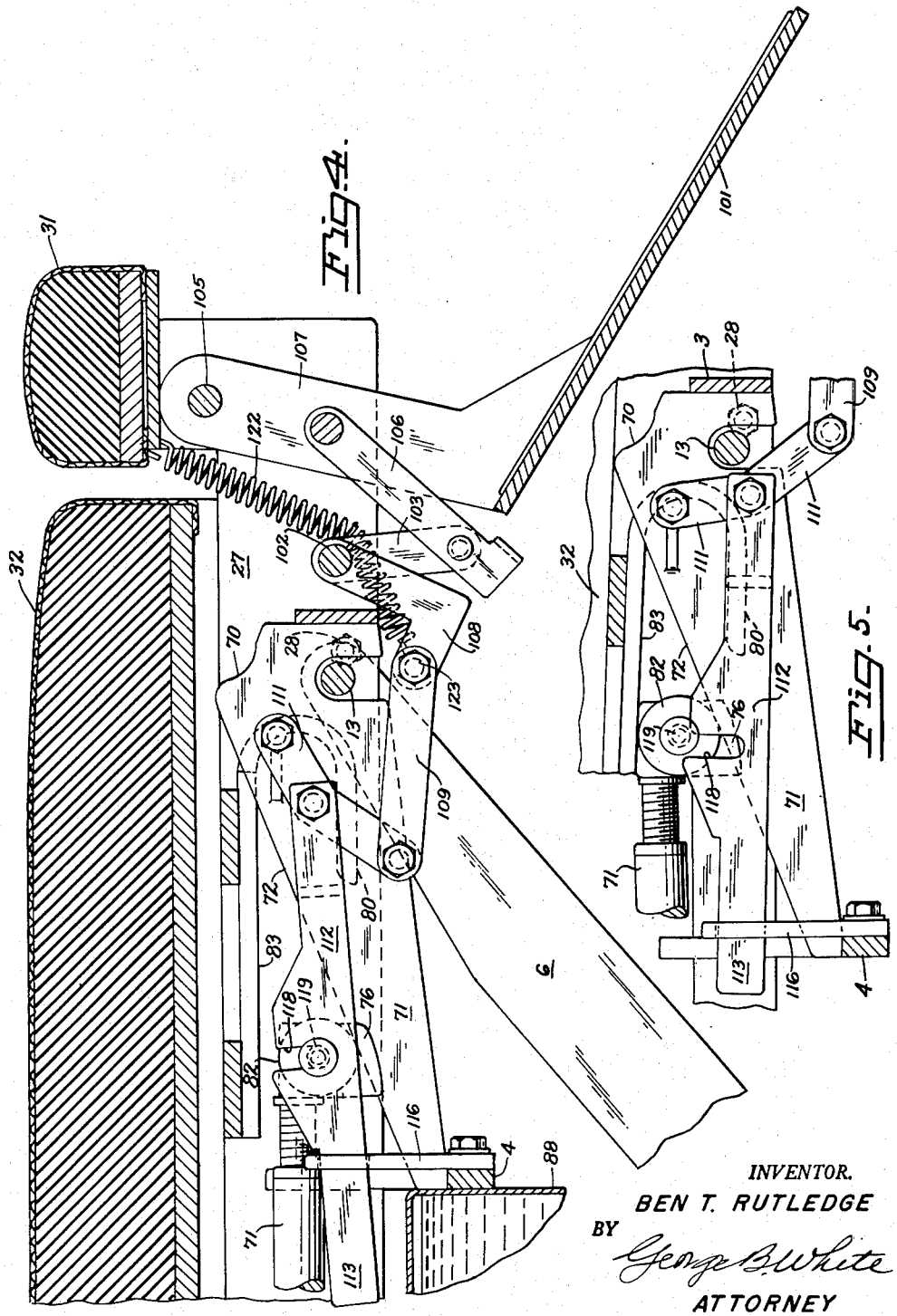

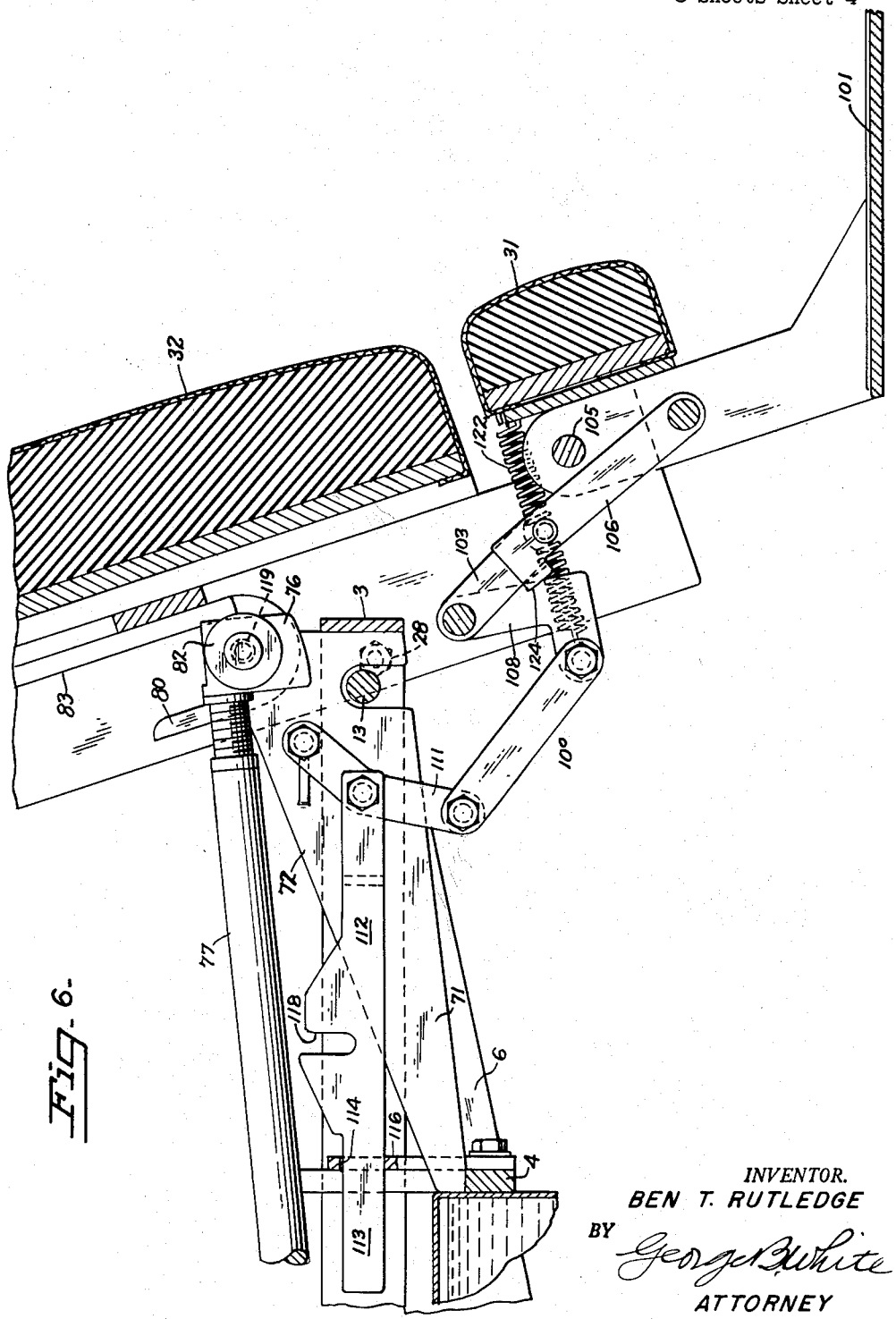

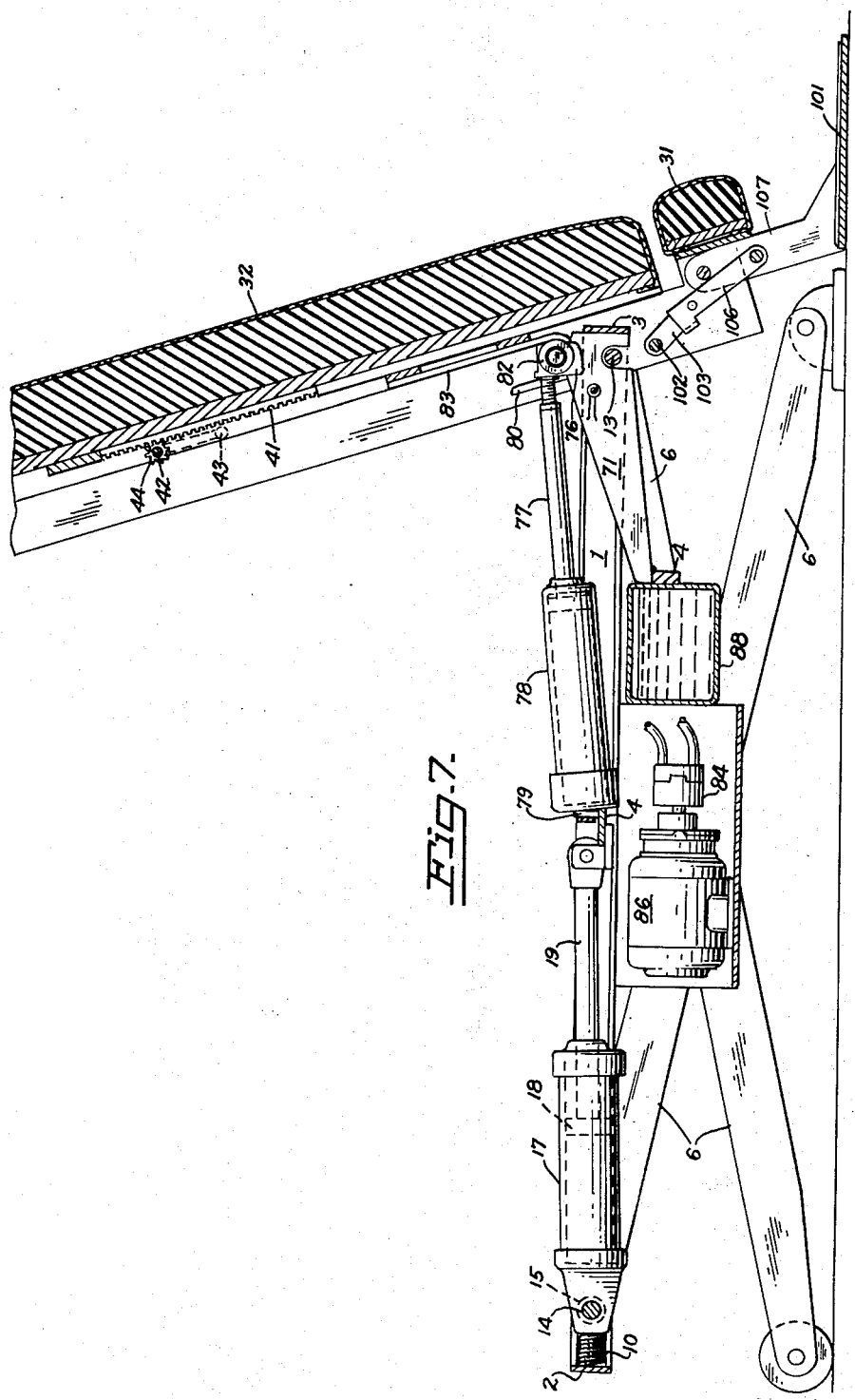

Dec. 10, 1963       B. T. RUTLEDGE       3,113,770
                  CHIROPRACTOR'S TABLE
Filed Nov. 28, 1960                      8 Sheets-Sheet 6
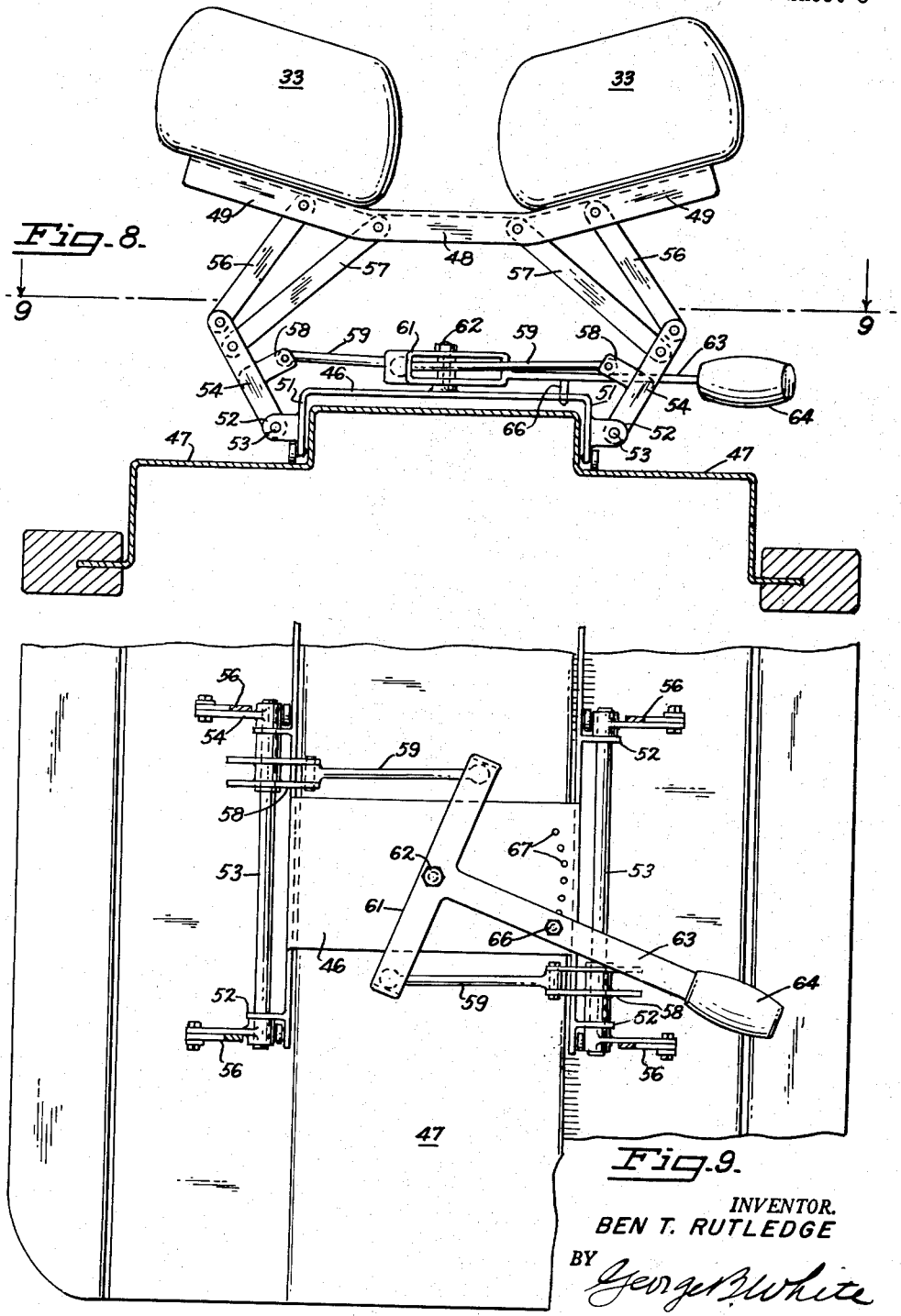
INVENTOR.
BEN T. RUTLEDGE
BY George B. White
ATTORNEY INVENTOR.
BEN T. RUTLEDGE
BY George B White
ATTORNEY Dec. 10, 1963     B. T. RUTLEDGE     3,113,770
CHIROPRACTOR'S TABLE
Filed Nov. 28, 1960     8 Sheets-Sheet 8

INVENTOR.
BEN T. RUTLEDGE
BY George B. White
ATTORNEY

United States Patent Office 3,113,770
Patented Dec. 10, 1963

3,113,770
CHIROPRACTOR'S TABLE
Ben T. Rutledge, 418 8th St., Petaluma, Calif., assignor of one-half to James M. Sansi, Albion, Calif.
Filed Nov. 28, 1960, Ser. No. 72,144
4 Claims. (Cl. 269—325)

This invention relates to a chiropractor's table.

The primary feature of the invention is to provide a chiropractor's examining table on which a patient could be placed conveniently in a generally standing position and then lowered to a horizontal position and by easy manipulation the table can be adjusted to a suitable attitude and a height convenient for the particular examination or treatment.

It is an object of the invention to provide a chiropractor's table wherein the level of the table can be lowered near the floor from which point the table can be tilted upwardly to a suitable angle and being provided with suitable devices so that the patient can stand and lean forwardly on the tilted table and then lowered to a suitable position and thereafter by easy and quick control the table can be elevated to a suitable height for treatment.

Further features of the invention are: the forming of scissors legs one foot of which is provided with antifriction device to securely grip the floor and the other with a roller to facilitate the raising and lowering of the table without skidding; the positive control for tilting the top of the table to a convenient and suitable angle; the automatic arrangement achieved by the action of the tilting of the table to swing a foot support under the tilted table on which the patent can stand while leaning face down upon the tilted table; the convenient and easy control devices for applying power for the tilting of the table and for the raising or lowering of the table with positive automatic limits both as to the tilting and as to ultimate height of raising the table; easy and quick adjustment of the head rest to a variety of positions; and quick and positive adjustment of the body and head support relatively to the foot rest to accommodate the height of the patient.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 2 is a bottom plan view of the tiltable table top frame.

FIG. 3 is a top plan view of the table mechanism and the table top in upright position.

FIG. 4 is a fragmental, sectional view of the foot end of the table.

FIG. 5 is a fragmental view showing the foot rest linkage in intermediate position of the tilting table top.

FIG. 6 is a fragmental partly sectional view of the table showing the top tilted.

FIG. 7 is a fragmental view partly in section of the table and the table top tilting mechanism.

FIG. 8 is a fragmental end view of the table showing the head rest device elevated.

FIG. 9 is a partly sectional fragmental top plan view showing the head rest raising mechanism, viewing in the direction of arrows 9—9 on FIG. 8.

Figure 1:
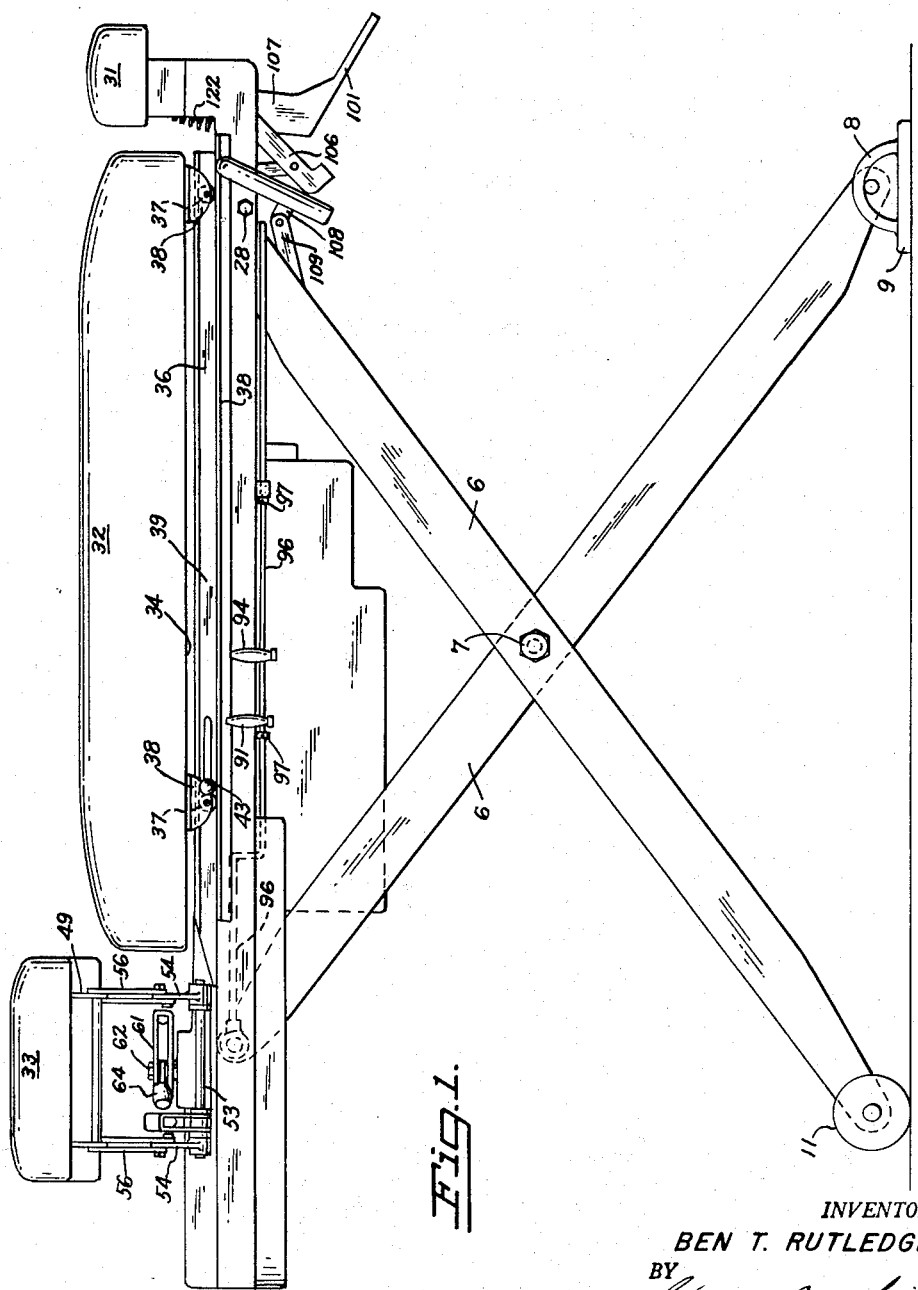
FIG. 1 is a side view of the table in raised position.
Figure 10:
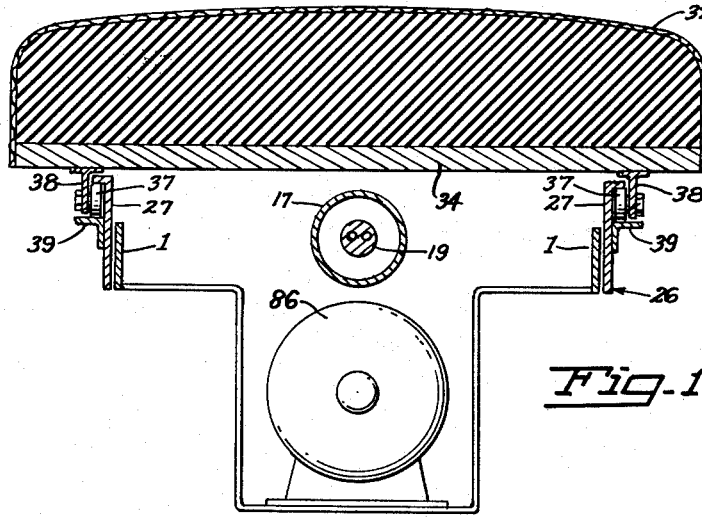
FIG. 10 is a fragmental cross-sectional view showing the roller support of the table top on the frame.
Figure 11:
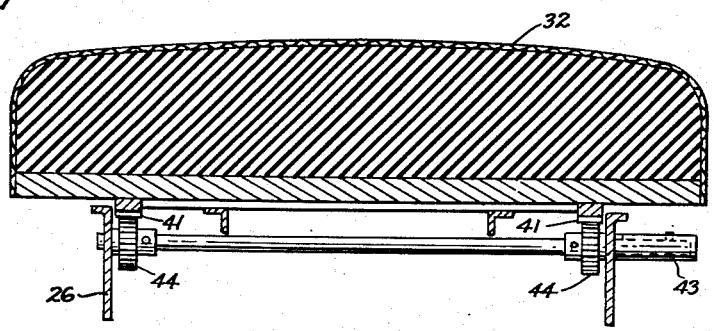
FIG. 11 is a cross-sectional view showing adjustability of the body pad on the rack and gear support.
Figure 12:
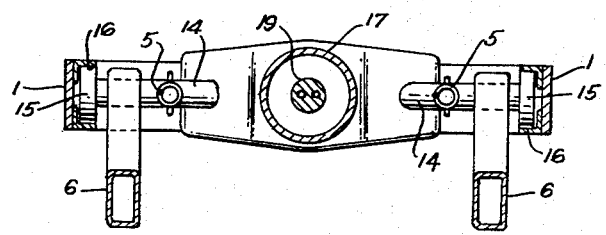
FIG. 12 is a fragmental sectional detail view showing the movable top end of the scissor legs.

In detail my invention includes a pair of longitudinal horizontal frame bars 1 which are connected at the ends thereof by cross-bars 2 and 3 and by an intermediate bar 4 at suitably spaced distance so as to form a table frame. To each end of the longitudinal frame bars 1 is pivoted the top end of a cross leg 6. There are four such cross-legs one engaged with each longitudinal frame bar 1. On each side, the pair of cross-legs are pivotally connected by a suitable pivot 7. The lower end of each cross-leg 6 below the foot end of the table frame is provided with a suitable yoke 8 pivoted thereon and at the bottom of each yoke is a friction pad 9 adapted to grip the floor on which the table stands. The lower ends of the other cross-legs below the head end of the frame are provided with rollers 11 so as to facilitate the travel of these lower ends toward and away from the friction pad 9 respectively when the table is raised or lowered. The upper ends of the cross-legs adjacent the foot end of the frame are pivoted on a pivot shaft 13 held in the frame bars 1. The upper ends of the cross-legs adjacent the head end of the table are pivoted on a slidable pivot shaft 14. Rollers 15 on the ends of said slidable pivot shaft 14 are guided along the frame bars 1 by suitable guides, such as between channel flanges 16 on the top and bottom edges of the frame bars 1.

The mechanism for raising and lowering the table includes a cylinder 17 an end of which is pivoted on the slidable pivot shaft 14. A piston 18 works in the cylinder 17 and a piston rod 19 extending from the other end of the cylinder 17 is suitably connected to and braced against and pivoted on the cross bar 4 of the frame so that when pressure medium is introduced through a suitable control valve 21 between the piston and the head end of the cylinder 17, then the cylinder 17 is pushed away to travel on the piston toward the head end of the frame and thereby pushes the upper slidable ends of the respective cross-legs 6 for lowering the table. When the pressure is introduced between the piston and the braced end of the cylinder 17, then the cylinder 17 is moved to the right viewing FIG. 3 so as to pull the upper slidable ends of the respective cross-legs 6 in the respective guides to the right and thus raise the table correspondingly.

A coil spring 5 along each side of the cylinder 17 is anchored at one end thereof in the brace bar 4 and its other end on the slidable pivot shaft 14 so as to urge and maintain the slidable pivot shaft 14 in table raising position. The cylinder 17 acts against the springs 5 when moved for lowering the table. Cushion springs 10 at the head end of the table frame absorb shock when the table frame is fully lowered.

The patient is supported on a tiltable frame 26 pivoted on the foot end of the base frame. The tiltable frame 26 has longitudinal side bars 27 which are pivoted by suitable pivots 28 on the foot ends of the frame bars 1. These longitudinal tiltable side bars 27 are adapted to rest upon the frame bars 1 in the horizontal position. These longitudinal tiltable side bars 27 are connected by suitable cross bars 29. On the tiltable frame 26 there are a fixed foot pad 31 at the foot end thereof, a longitudinally adjustable body pad 32, and spaced head pads 33, which latter are so arranged that as the patient lies face down on the table the mouth and the nose of the patient are free between the spaced head pads 33. In the present illustration the head pads 33 and the body pad 32 are supported together on a pad base 34, which latter is slidably held on the longitudinal side bars 27 of the tiltable frame 26 by means of rollers 37 on spaced brackets 38 extended downwardly from the pad base 34 along the outside of the longitudinal side bars 27 of the tiltable frame 26. On the outside of each longitudinal side bar 27 is formed a guide channel 39 in which the rollers 37 are held and guided. The body pad 32 is mounted directly on the top of the pad base 34. The head pads 33 are suitably supported on, as hereinafter described, and connected to the pad base 34 so as to be adjustable together with the body pad 32, relatively to the foot pad 31 to accommodate the height of the patient.

For the adjustment of the body pad 32 and the head pads 33 there are provided a pair of parallel racks 41 extended longitudinally along the bottom of the pad base 34 and mounted on a reinforcing plate frame 40. A cross shaft 42 is journalled in the longitudinal side bars 27 of the tiltable frame and is provided with a suitable pull-out crank handle 43 at each end for turning the cross-shaft 42. On the cross-shaft 42 are pinions 44 in engagement with the respective racks 41 so that as the crank handle 43 is turned, it turns the cross-shaft 42, and the pinions 44, and thus causes the racks 41 to travel longitudinally and thereby adjust the pad base 34 on the tiltable frame 26 relatively to the foot pad 31.

The head pads 33 are also adjustable to various elevations or heights above the tiltable frame 26. For the purpose of this adjustment a head pad base 46 is supported on an upward projection 47 which latter forms the foot end of the tiltable frame 26. Spaced above this head pad base 46 is a pad plate 48 parallel with the head pad base 46 at its intermediate portion. The opposite ends 49 of the pad plate 48 are bent upwardly slightly and each supports a head rest or head pad 33 so that the head pads 33 can support the opposite cheeks of the patient. The pad plate 48 is supported on the vertical flanges 51 of the head pad base 46 by suitable extensible linkage.

In outwardly extended bearing lugs 52 on each side flange 51 of the head pad base 46 is journalled a shaft 53. There are a pair of spaced lugs 52 on each side to form suitable bearings for the shaft 53. On each end of the shaft 53 is provided a lever arm 54 which is keyed on the shaft 53 so as to be swung by the turning of the shaft 53. On the outer end of the lever arm 54 is pivoted a link 56 which extends upwardly and inwardly toward the pad plate 48 and is pivoted at its upper end to one of the end portions 49 of the pad plate 48.

Spaced below the link 56 extends another pivoted link 57 from the lever arm 54, the inner upper end of which link 56 is pivoted to the base plate 48 near the base of the outwardly turned plate end 49. Thus as the shaft 53 is turned so as to turn lever arms 54 the same will push through the links 56 and 57 the pad plate 48 and the head pads 33 upwardly as desired. When lever arms 54 are turned downwardly, then the links 49 and 57 lower the pad plate 48 and the head pads 33.

For the adjustment of the head pad the shafts 53 are turned simultaneously. On each shaft 53 is provided a crank 58. From each crank 58 extends a link 59 above the head base plate 46 and toward the center thereof. The cranks 58 and the links 59 are spaced apart so that the links 59 pivotally engage opposite ends of a rocking lever 61. This rocking lever 61 has a downwardly extended stub shaft 62 thereof journalled on the top of the head pad base 46 so that the rocking lever 61 may be rocked about its center in opposite directions and accordingly rock the cranks 58 for rocking the shafts 53 for the raising or lowering of the head pads 33 as heretofore described. To facilitate manipulation and fixing of this adjustment mechanism a handle bar 63 extends from the rocking lever 61 to one side and terminates in a suitable handle 64 whereby the rocking of the lever 61 is facilitated. From this handle bar 63 extends downwardly a pin 66 which is engaged, by pressing the handle downwardly, with any one of a series of keeper holes 67 to hold the head pads in any adjusted position. The keeper holes 67 are arranged on an arc to accommodate the arcuate travel of the pin 66 as the handle 54 is rocked in opposite directions.

Figure 14:
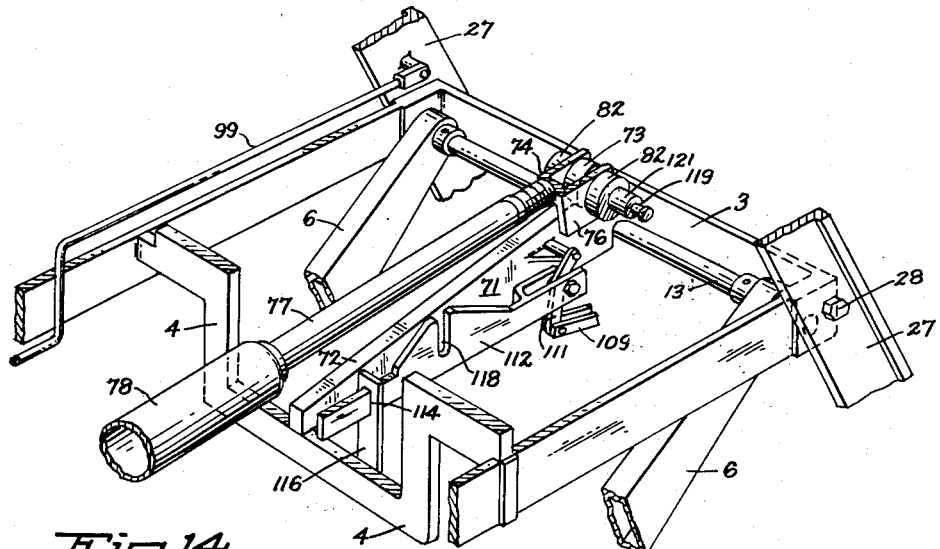
FIG. 14 is a fragmental perspective view of the top tilting mechanism at the foot end of the table and the tilting wedge therefor.

The mechanism for tilting the tiltable frame 26 includes a wedge 71, shown in FIGS. 7 and 14. The lower end of the wedge 71 is secured to the cross-bar 4 nearer the foot end of the base frame, and the higher end thereof is secured to the foot end cross-bar 3 so that the top or bearing edge 72 of the wedge rises upwardly toward and above the pivot 28 of the tiltable frame 26. As shown in FIG. 4, the top bearing edge 72 of the wedge 71 reaches its maximum height in advance of or spaced from and above the pivot 28 and terminates in a pocket 70. On this wedge bearing edge 72 rides a central roller 73 journalled in a yoke bearing 74, as shown in FIG. 14. Flanges 76 extend downwardly from the yoke bearing 74 and overlap the opposite sides of the wedge 71 so as to guide the roller 73 on the top edge 72 of the wedge 71. The yoke bearing 74 is at the end of the piston rod 77 which extends through an end of a tilting cylinder 78, which latter is fulcrumed at its other end on a suitable fulcrum bracket 79 on an intermediate cross-bar 4. A piston on the end of the piston rod 77 works within the cylinder 78 in the usual manner. Another control valve 81 controls the pressure medium to the cylinder 78 so as to admit pressure medium to either side of the piston according to the setting of the control valve so as to move the piston rod 77 in the respective directions.

On each side of the yoke bearing 74 is located a tilter roller 82 each of which rides and bears against a suitable rail 83 on the underside of the tiltable frame 26. Normally the tiltable frame 26 rests flat and horizontal on the top of the frame bars 1 and the rollers 82 are in an initial position at the lowest portion of the wedge bearing edge 72. One of the rails 83 has a pocket hook 80 for the adjacent tilter roller 82 when the table top is tilted to steady the same. In order to tilt the tiltable frame 26 the control valve 81 is manipulated in the usual manner to admit the pressure medium to the fulcrumed end of the cylinder 78 thus move the piston and the piston rod 77 toward the foot end of the table. During such movement the weight of the tiltable frame 26 holds the middle roller 73 on the rising bearing edge 72 while the tilter rollers 82 ride on the rails 83 and push the tiltable frame 26 upwardly about its pivots 28 from the position shown in FIG. 4 to the position shown in FIG. 6. When it is desired to lower the tiltable frame 26 into its initial position, then the piston is operated so as to move away from the foot end of the table and thereby the rollers 82 ride downwardly along the top bearing edge 72 of the wedge 71 and permit the tiltable frame 26 to return to its initial horizontal position.

Figure 13:
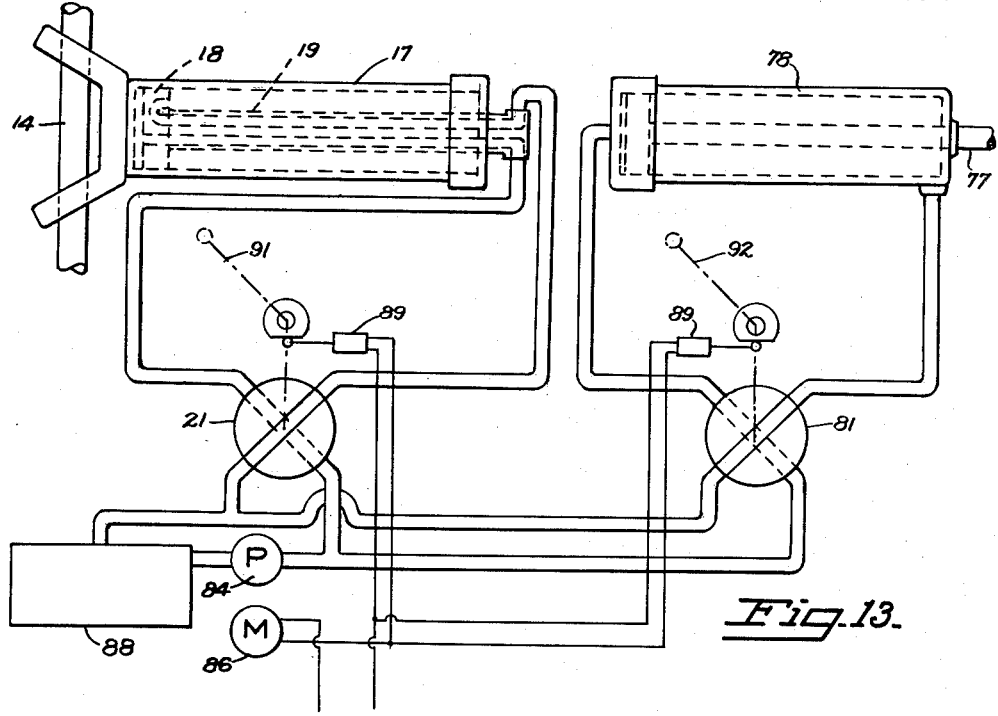
FIG. 13 is a diagrammatic view of the hydraulic controls for the mechanisms of the table.

The pressure medium for operating in the cylinders, in the present illustration, is a liquid under pressure fed through a pump 84 indicated only in outline in FIG. 13, and is preferably operated by an electric motor 86. This electric motor 86 can be plugged in through a usual wire and plug into the regular wiring of a building. The pump 84 obtains the liquid from a reservoir 88 in the usual manner. The pump 84 pumps the liquid to the respective control valves according to the manipulation of the same. Each control valve has a reversing switch 89 suitably connected thereto so as to be operated simultaneously with the valve. Each switch is connected in the usual way in the circuit of the motor 86 so that whenever an actuating handle is moved in either direction to shift the respective control valve to communicate a conduit to the respective end of the cylinder, it also closes the circuit of the motor for the pumping operation to furnish the pressure medium, and when the valve is closed, it breaks the motor circuit. A handle 91 operates the switch which controls the control valve 21 for the purpose of shifting the cylinder 17 for the lowering or raising of the entire table in the manner heretofore described. Another handle 92 operates the switch and the control valve 81 for the operation of the piston in the other cylinder 78 for the tilting or lowering of the tiltable frame 26 according to the direction in which the handle 92 is turned. In the present illustration, from each handle 91 and 92 extends an extension rod 93 to the respective opposite sides of the device and each rod 93 terminates in another handle 94 which shifts correspondingly with initial handle 91 and 92 respectively so as to permit the control of table operation from either side.

In order to limit the raising and lowering of the table a limit rod 96 is extended from one of the leg pivots 12 so that when the leg pivot 12 is shifted inwardly toward the middle of the frame for raising the table or vice versa, then the limit rod 96 travels therewith. The limit rod 96 is bent and positioned so that it crosses very close to the rod or narrow portion of the handle 91. The limit rod 96 has a pair of adjustable abutments 97 spaced to the opposite sides of the handle 91 and are adjustable so as to be suitably fixed in adjusted positions. When the respective abutments reach the handle 91, they snap the handle to neutral position and thereby stop the electric motor and the pump operation and close the control valve so as to hold the table in the adjusted position. The operation of the handle is so arranged that in order to raise the table the handle 91 is shifted about its pivot 98 toward the foot end of the table and in order to lower the table, the handle 91 is shifted about its pivot 98 toward the head of the table from the neutral valve closing position.

Similarly there is another limit rod 99 pivotally connected to the longitudinal side bar 27 of the tilting frame 26 and then bent so as to traverse the other handle 92. Similar abutments 97 on the limit rod 99 are adjustable to abut the handle 92 at the limit of movement in the respective directions and thereby to snap the handle 92 to neutral valve closing position, for instance, to stop the tilting of the tiltable frame 26 upwardly at an angle less than 90 degrees in the upright position, and to stop again when the tiltable frame 26, is lowered to horizontal position.

A foot stand 101 is normally concealed under the foot pad 31 of the tiltable frame 26 and a mechanism is provided to automatically turn the foot stand 101 beyond the foot pad 31 and at such an angle as to accommodate a patient standing thereon when the tiltable frame 26 is in the tilted position shown in FIG. 4. This mechanism withdraws the foot stand 101 into its concealed position when the tiltable frame 26 is returned to its horizontal position, as shown in FIG. 4. This automatic mechanism includes a rocking shaft 102 from which extend spaced toggle links 103 to be rocked by the shaft 102. The rocking shaft 102 is suitably journalled in the opposite longitudinal frame bars 27 near the foot pad 31. Another pair of connecting toggle links 106 are pivoted on side flanges 107 respectively on the opposite side edges of the foot stand 101 at such an angle that when the toggle links 103 and 106 are extended in the position shown in FIG. 6, the foot stand 101 is in a position to operate as a stand on which the patient can step in order to lie face down on the pads of the tiltable frame 26. When the toggle links 103 and 106 are collapsed into the position shown in FIG. 4, then the pull exerted on the side flanges 107 pulls and turns the foot stand 101 into concealed horizontal position as shown in FIG. 4. The flanges 107 of the foot stand 101 are pivoted on a pivot shaft 105 under the foot pad 31.

The rocking of the rocking shaft 102 is accomplished by a crank arm 108 fixed on the shaft 102. To this crank arm 108 is pivotally connected a pull link 109. This pull link 109 extends to a downwardly extending crank lever 111, fulcrumed on the side of the wedge 71. The forward end of a flat pull-push plate 122 is pivotally connected to the middle of the bent crank lever 111. The forward or free end 113 of the pull-push plate 112 is reduced and is loosely or tiltably guided in a slot 114 of a guide plate 116. The guide plate 116 is mounted on an intermediate cross bar 4. The top edge of the pull-push plate 112 is inclined downwardly toward the crank lever 111 and has a vertical slit 118 therein. The forward edge of the slit 118 nearer the guide plate 116 is higher than the rearward edge of the slot nearer the crank lever 111. A trip pin 119 is extended from the pivot shaft 121 of the rollers on the end of the piston rod 77. As the middle roller 73 rides downwardly on the inclined edge 72 of the wedge 71 the trip pin 119 engages the high side of the slit 118 and pulls the plate 112 toward the head end of the table thereby turns the crank 108 downwardly or away from the tilting frame 26 in a clockwise direction viewing FIG. 6 for correspondingly pulling the foot stand 101 toward the concealed position, shown in FIG. 4. As the piston rod 77 is pushed up on the inclined edge 72 of the wedge 71, for tilting the tiltable frame 26 to the upright position, the trip pin 119 pushes the plate 112 toward the foot end of the table thereby turns the crank 118 in contra-clockwise direction viewing FIG. 4, for extending the foot stand 101 into operative position as shown in FIG. 6. A coil spring 122 is anchored at its upper end at the bottom of the foot pad 31 and at its lower end at the pivot 123 of the link 109 on the crank arm 108 so as to urge the crank arm 108 in contra-clockwise direction viewing FIG. 6 and thereby hold the toggle links 103 and 106 in extended position. An abutment flange 124 along the lower edge of the toggle link 106 past its dead center abuts the lower edge of the upper toggle link 103, as shown in FIG. 4, to prevent the action of the spring 122 from folding the toggle.

In operation, after the table is lowered into the position indicated in FIG. 7, the handle 92 is turned to open the valve 81 to the bottom of the cylinder 78 and thus push the piston rod 77 to tilt the tiltable frame 26 toward the position shown in FIG. 7. As the piston rod 77 pushes the roller 73 up on the inclined top 72 of the wedge 71 the trip pin 119 pushes the plate 112 toward the foot end of the table from the position shown in FIG. 4 to the position shown in FIG. 5, where the trip pin rises out of the slit 82. By this time the crank lever 111 is swung contra-clockwise to the position shown in FIG. 5 and thus pushes the link 109 so as to rock the crank 108 toward the foot end of the table thereby to rock the toggle link 103 to set the toggle links 103 and 106 into substantially straightened position. As the tilting frame 26 is tilted further the toggle being held straightened by the spring 122 holds the crank arm 108 stationary, but as the crank arm 108 is moved around the fulcrum of the frame pivot 28 with the tilting frame 26, it moves back clockwise toward the head of the table and pushes the link 109 and rocks the crank lever 111 in a clockwise direction and thus pushes the plate 112 toward the head end of the table into the position shown in FIG. 6. But when the toggle links 103 and 106 are straightened, the foot stand 101 is pushed about its pivot 105 into the extended position shown in FIG. 6. The patient then stands on the foot stand 101 and rests face down on the body pad 32 and head pads 33. In this position the handle 92 is manipulated to set the valve 81 so as to admit pressure medium to the free end of the cylinder and thus pull the piston rod 77 into the cylinder gradually and allow the tilted frame 26 to lower the patient to a horizontal position on the table. Then the other handle 91 is manipulated so as to raise the table to a desired height, in the manner heretofore described and support the patient in convenient position for examination and treatment.

I claim:

1. In a chiropractor's table, a table frame, elevatable legs on the table frame, manipulable means to raise or lower said table frame in horizontal attitude, a tiltable frame pivoted at the foot end of said table frame, and manipulable tilting means supported on the table frame and connected to said tiltable frame to tilt said tiltable frame into a substantially upright position at will and to hold said tiltable frame in said tilted position, and said tilting means including a wedge on the table frame rising toward the foot end of the table, a first roller confined for riding on the inclined edge of said wedge, and second rollers correlated withe said first roller and bearing against the underside of said tiltable frame for tilting said frame.

2. In a chiropractor's table, a table frame, elevatable legs on the table frame, manipulable means to raise or lower said table frame in horizontal attitude, a tiltable frame pivoted at the foot end of said table frame, and manipulable tilting means supported on the table frame and connected to said tiltable frame to tilt said tiltable frame into a substantially upright position at will and to hold said tiltable frame in said tilted position, said tilting means including a wedge on the table frame rising toward the foot end of the table, a first roller confined for riding on the inclined edge of said wedge, and second rollers correlated with said first roller and bearing against the underside of said tiltable frame for tilting said frame, and rails on the underside of said tiltable frame engaged by said second rollers, each of said manipulable means including a piston rod and pressure means on the table frame to reciprocate the piston rod.

3. The invention defined in claim 1, and a foot stand at the foot end of the tiltable frame, a device to hold the foot stand in concealed position under the table when the tiltable frame is in horizontal position, and coacting means on said table and coacting with said device on said tiltable frame actuated by said tilting means to move said foot stand from said concealed position into operative position while said tiltable frame is tilted to accommodate the foot of a patient to stand on while leaning against the tilted table top, said coacting means for said foot stand including a rocking shaft and toggle link connections to raise and hold the foot stand in operative position, and a link device extended alongside said wedge to rock said shaft, and an actuating device extended from said rollers coacting with said link device for pulling and pushing said link device for rocking said shaft in the respective directions for withdrawing or pushing said foot stand respectively into inoperative or operative positions.

4. In a chiropractor's table, a table frame, elevatable legs on the table frame, manipulable elevating means mounted on said table frame and connected to said legs to raise or lower said table frame in horizontal attitude, a tiltable frame pivoted at the foot end of said table frame, manipulable tilting means separate from said elevating means and mounted on the table frame and connected to said tiltable frame to tilt said tiltable frame into a substantially upright position at will and to hold said tiltable frame in said tilted position independently of said elevating means; and a foot stand at the foot end of the tiltable frame, a device to hold the foot stand in concealed position under the table when the tiltable frame is in horizontal position, and coacting means on said table and on said tiltable frame coordinated with said tilting means to move said foot stand from said concealed position into operative position while said tiltable frame is tilted to accommodate the foot of a patient to stand on while leaning against the tilted table top.

References Cited in the file of this patent

UNITED STATES PATENTS

| | | |
|---|---|---|
| 2,092,266 | Talas | Sept. 7, 1937 |
| 2,526,879 | Kizaur | Oct. 24, 1950 |
| 2,571,829 | Buckley | Oct. 16, 1951 |
| 2,630,800 | Voss et al. | Mar. 10, 1953 |
| 2,675,285 | Terry et al. | Apr. 13, 1954 |
| 2,787,509 | Hardrath | Apr. 2, 1957 |
| 2,851,320 | Lorang | Sept. 9, 1958 |
| 2,895,775 | McDonald et al. | July 21, 1959 |

FOREIGN PATENTS

| | | |
|---|---|---|
| 36,127 | Sweden | June 28, 1914 |